(12) United States Patent
Rodriguez Rodriguez et al.

(10) Patent No.: US 8,159,103 B2
(45) Date of Patent: Apr. 17, 2012

(54) LOW-INERTIA PERMANENT-MAGNET ELECTRICAL MACHINE ROTOR

(75) Inventors: Rafael Rodriguez Rodriguez, Zamudio (ES); Jaime Peredo Argos, Zamudio (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 144 days.

(21) Appl. No.: 12/303,573

(22) PCT Filed: Jun. 12, 2007

(86) PCT No.: PCT/ES2007/070115
§ 371 (c)(1),
(2), (4) Date: Apr. 20, 2010

(87) PCT Pub. No.: WO2007/147922
PCT Pub. Date: Dec. 27, 2007

(65) Prior Publication Data
US 2010/0277024 A1    Nov. 4, 2010

(30) Foreign Application Priority Data
Jun. 14, 2006  (ES) .................................. 200601601

(51) Int. Cl.
*H02K 1/28* (2006.01)
*H02K 1/27* (2006.01)
*F03D 11/00* (2006.01)
*H02K 1/30* (2006.01)

(52) U.S. Cl. ......... 310/156.12; 310/156.08; 310/156.59; 310/261.1

(58) Field of Classification Search .......... 310/152–153, 310/156.12, 156.59, 156.15, 75 D, 156.08, 310/156.09, 156.11, 156.13, 156.14, 156.18, 310/156.19, 156.21, 156.24, 156.25, 156.26, 310/156.28, 156.29, 156.31, 156.55, 269
See application file for complete search history.

(56) References Cited

U.S. PATENT DOCUMENTS

| | | | | |
|---|---|---|---|---|
| 3,488,836 A * | 1/1970 | Wheeler | ........................ | 29/596 |
| 3,561,833 A * | 2/1971 | Heilmann et al. | ............. | 310/46 |
| 3,858,308 A * | 1/1975 | Peterson | ........................ | 29/598 |
| 4,296,544 A * | 10/1981 | Burgmeier et al. | ............ | 29/598 |
| 4,633,113 A * | 12/1986 | Patel | ........................ | 310/156.28 |
| 4,663,551 A * | 5/1987 | Weh et al. | ..................... | 310/152 |
| 5,047,681 A * | 9/1991 | Gaillard et al. | .......... | 310/156.55 |
| 6,262,508 B1 * | 7/2001 | Shibayama et al. | ......... | 310/181 |
| 6,288,467 B1 | 9/2001 | Lange et al. | | |
| 6,392,324 B1 * | 5/2002 | Kuwahara | ............... | 310/156.11 |
| 6,452,301 B1 * | 9/2002 | Van Dine et al. | ........ | 310/156.12 |
| 6,509,667 B1 * | 1/2003 | El-Antably et al. | ....... | 310/261.1 |

(Continued)

FOREIGN PATENT DOCUMENTS
JP           61-58453          3/1986
(Continued)

*Primary Examiner* — Burton Mullins
(74) *Attorney, Agent, or Firm* — Ladas & Parry LLP

(57) ABSTRACT

A rotor (11) for an electric machine with low-inertia permanent magnets (13) located between the poles (15) of the electric machine and a rotor hub, where the rotor hub is comprised of an internal ferrule (21) and an intermediate ring (23) between it and said magnets (13), with said intermediate ring (23) being made of an amagnetic material (such as aluminum, a composite material or a plastic material) of minimum thickness which prevents flux losses, and with the internal ferrule (21) being made of a metal material (such as cast iron or steel) with sufficient thickness to resist, together with the intermediate ring (23), the mechanical stresses caused by rotor (11) operation.

9 Claims, 1 Drawing Sheet

U.S. PATENT DOCUMENTS

| | | | |
|---|---|---|---|
| 7,148,598 B2 * | 12/2006 | Ionel et al. | 310/156.55 |
| 7,183,683 B2 * | 2/2007 | Shafer et al. | 310/156.28 |
| 7,617,582 B2 * | 11/2009 | Down et al. | 29/447 |
| 2005/0028351 A1 | 2/2005 | Reiter, Jr. et al. | |

FOREIGN PATENT DOCUMENTS

| | | |
|---|---|---|
| JP | 61-58454 | 3/1986 |
| JP | 1-295652 | 11/1989 |
| JP | 2005-198381 A * | 7/2005 |

* cited by examiner

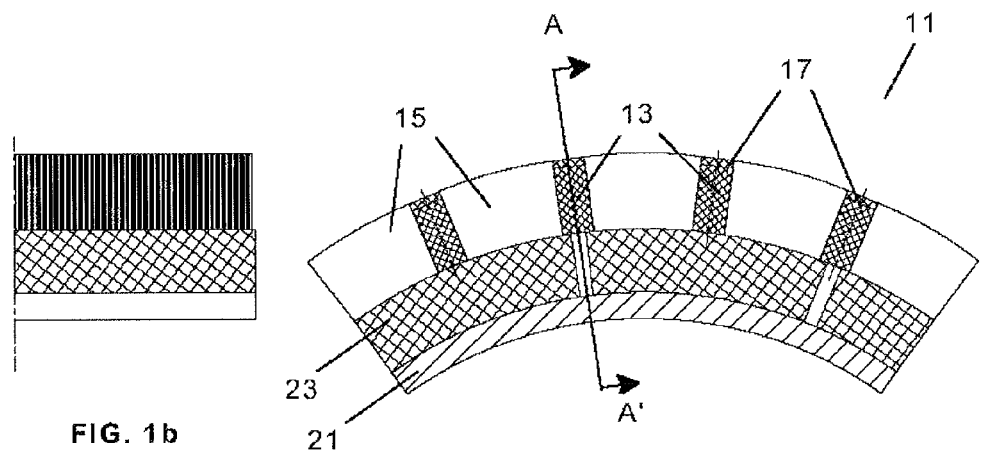
FIG. 1b
FIG. 1a
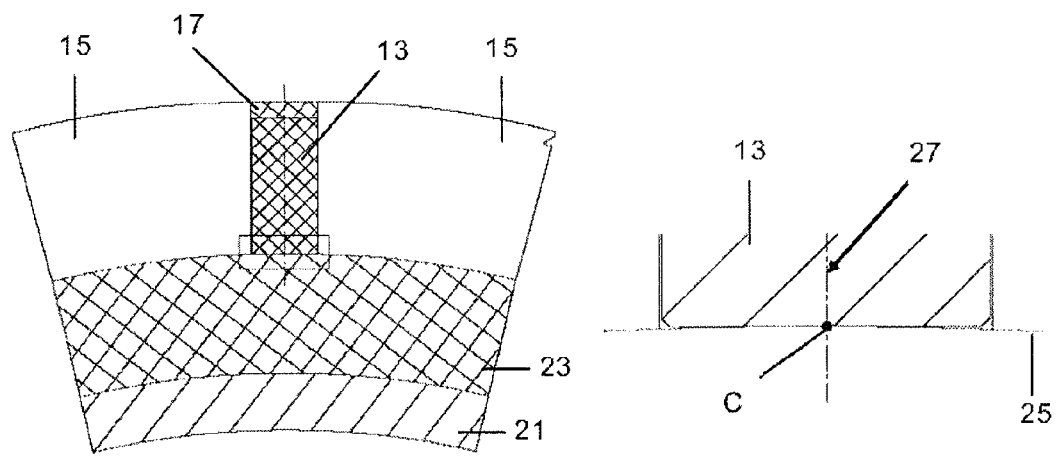
FIG. 2a
FIG. 2b

LOW-INERTIA PERMANENT-MAGNET ELECTRICAL MACHINE ROTOR

FIELD OF THE INVENTION

This invention refers to a rotor for a permanent magnet electric machine structured in such a way that it prevents flux lines penetrating the centre of the rotor, and in particular a low inertia rotor for wind turbine generators.

BACKGROUND

Generators that are commonly used for wind turbines are asynchronous generators, whether with coiled rotor or caged rotor or salient pole synchronous motors or cylindrical rotor. However, for some time now, it seems that permanent magnet generators have been those most often used as they provide a series of advantages compared with others, such as the low maintenance required, and the reduced possibility of machine failure. Within what are termed as permanent magnet machines, we can distinguish between the generators with permanent magnets on the surface and those with embedded permanent magnets.

Surface magnet generators are comprised of rotor hubs which house the permanent magnets. Whether the rotor material itself is magnetic or not, the elements which make contact with the permanent magnets in this type of generator must be constructed of magnetic materials. These magnets are then stuck to the surface of the rotor ferrule and are fastened on with carbon fibre, fibre glass or nylon fibre materials.

In embedded magnet generators, the magnets are protected by the magnetic plate poles and by shims placed upon them in order to achieve complete robustness both from a mechanical point of view, as the magnets are completely protected, and from an electrical point of view, as the currents needed to demagnetise the magnets are greater than in the case of machines with magnets on the surface.

These characteristics mean that generators with embedded magnets are usually preferred to generators with surface magnets for applications which demand high rotation speeds or for applications where the machine must operate under extreme conditions.

Various proposals are known for preventing flux lines penetrating the rotor in embedded magnet electric machines, all of which have in common the insertion of a non magnetic material between the magnets and the internal part of the rotor.

U.S. Pat. No. 5,684,352 describes an embedded magnet rotor made up of various superimposed laminates, on each of said laminates there are both ferromagnetic zones and non magnetic zones placed in such as way that they prevent magnetic flux leakage to unwanted areas of the generator. Each of these laminates contains slots in which to embed the permanent magnets along with a hole in which the rotor shaft is inserted. The made are made in one part and with one material where the ferromagnetic and non magnetic zones are only differentiated by the crystalline structure of the material. The permanent magnets embedded in these sheets make contact by their poles with the ferromagnetic material, and make contact on the upper and lower sides with the non magnetic material. Thus preventing magnetic flux short-circuits. Once the permanent magnets are inserted, they are secured to the sheets using epoxy resin adhesive.

Applications US2003/0062792 and US2003/0062790 describe methods for making a permanent magnet rotor by sintering techniques, where the magnetic flux lines are redirected using the magnetic and non-conductive properties of the different parts of the rotor. In said rotors, the dispersion of the magnetic flux to the interior of the rotor shaft is avoided using a rotor ferrule of a non-magnetic material.

Application US2004/0212266 describes a rotor of one sole part where the permanent magnets and non conductive parts are embedded and are used to direct the magnetic flow towards the exterior.

Two important disadvantages of the aforementioned rotors are their high inertia levels and the high cost, for which this invention is intended to provide a solution.

SUMMARY OF THE INVENTION

This invention proposes a rotor for a permanent magnet electric machine which includes a plurality of permanent magnets located between the poles of the electric machine, and a rotor hub including an internal ferrule and an intermediate ring between it and said magnets, with said intermediate ring being made from amagnetic material of minimum thickness which prevents flux losses, and with the internal ferrule being made of a metal with sufficient thickness to resist, together with the intermediate ring, the mechanical stresses caused by rotor operation.

For the purpose of this invention, an amagnetic material is considered to be a material which prevents the magnetic field lines of the magnet reaching the magnetic parts situated below them and therefore, the magnet's magnetic lines are unable to pass through the machines air gap which would lead to a series of leaks due to dispersion at the magnets, and therefore, under-utilisation.

The electric machine may be a motor or a synchronous generator.

One advantage of this invention is the reduction of rotor inertia, as the combination of an intermediate ring made of an amagnetic material and a metal ferrule has less weight and inertia than a ferrule made of an amagnetic material, particularly in the case of machines of large diameter.

Another advantage of this invention is that it reduces the cost in comparison with rotors that use stainless steel ferrules.

Another advantage of this invention is that, at least with certain amagnetic materials, machining is not required in order to locate the magnets.

Other characteristics and advantages of this invention become apparent in the following detailed description and the accompanying figures, which describe but are not limited to an example of an embodiment.

BRIEF DESCRIPTION OF FIGURES

FIG. 1a is a schematic partial transversal section view of an embedded magnet rotor according to this invention and FIG. 1b is a section view along line A-A'.

FIG. 2a is an enlarged view of a part of FIG. 1a, and FIG. 2b is an enlarged view of the area of contact between the magnets and the amagnetic material plate.

DETAILED DESCRIPTION OF THE INVENTION

The rotor 11 according to this embodiment of the invention is comprised of a plurality of embedded magnets 13 which are located between the poles 15 of the machine and shims 17 of a non magnetic material, and a rotor hub comprised of a ferrule 21 of a material such as steel or cast iron and an intermediate ring 23 of amagnetic material arranged concentrically with said ferrule 21. The magnets 13 are arranged between the poles 15 with a slight transversal clearance (between pole and pole) and a slight radial clearance between the magnet 13 and shim 17.

The intermediate ring 23, which can be considered as a spacer element between the magnets 13 and the ferrule 21 may be either one continue part or made up of a plurality of elements arranged side by side, either touching or with an air gap between them, as shown in FIG. 1a.

The joints between the rotor components are made using stainless steel screws to prevent dispersion.

The amagnetic material must be sufficiently rigid to support the weight of the magnet and be light weight in order to greatly reduce the total weight of the rotor and consequently the inertia. I=F ($D^2$ L). The diameter D and the length L of the rotor will be a function of P/w, with P being the power generated and w the angular velocity at which the rotor rotates. These variables define the value of the rotor radius and the thickness of the amagnetic material in order to avoid dispersion and, therefore, indirectly determine the rotor inertia depending on the weight and the size of the materials used.

The thickness of the intermediate ring 23 must be dimensioned according to the power of the machine, its dimensions, and its voltage, etc. in order to ensure that the magnetic flux lines do not reach the ferrule 21 and therefore ensuring that dispersion is nil or as little as possible.

Table 1 indicates the reference values for the amagnetic intermediate ring 23 thickness for the corresponding machine power values, for reference purposes. The exact values must be obtained by performing the corresponding finite element analysis of the machine.

TABLE 1

| Power (kW) | Thickness (mm) |
|---|---|
| <1000 | <30 |
| 1000-2000 | 30-55 |
| 2000-3000 | 40-60 |
| 3000-4000 | 60-75 |

TABLE 1-continued

| Power (kW) | Thickness (mm) |
|---|---|
| 4000-5000 | 70-85 |
| >5000 | >80 |

In a preferred embodiment the amagnetic material is G11 Epoxy and the ring 23, located concentrically between the magnets 13 and the ferrule 21, has a curved exterior edge 25 which is not machined, in other words, it does not include specific housings for the magnets 13, in a parallelepiped form. Consequently, the magnets 13 rest contacting just at a point C along a straight line 27 on the intermediate ring 23.

Currently, and with the manufacturing process for fibre-reinforced polymer matrix composites, either by moulding or using the filament winding manufacturing method, sufficient tolerances are obtained for the parts to not require machining. However amagnetic metal casting requires subsequent machining in order to obtain the tolerances needed to prevent the magnets from breaking.

This invention may also be embodied with intermediate rings made from other amagnetic materials whether they are metals such as aluminium, or fibre-reinforced polymer matrix composite materials such as G10 Epoxy and the aforementioned G11 Epoxy, or plastic materials.

Among amagnetic metals, aluminium is considered to be the most preferable which, as the part would require machining, supposes a higher cost than the use of composite materials which do not require machining.

The ferrule 21 is dimensioned in order to ensure the mechanical resistance necessary to support the stresses of rotor operation.

The rotor according to this invention has considerably less weight and inertia that the known rotors where the rotor hub is comprised of a stainless steel ferrule, as shown in Table 2.

Table 2 compares the significant parameters of a known rotor which has a stainless steel ferrule, an external diameter of 1286 mm and a thickness of 82 mm with a rotor according to this invention of the same external diameter and with an intermediate ring 23 of G11 Epoxy with a thickness of 82 mm and a standard steel ferrule 21 of 40 mm in thickness. The length considered is 600 mm.

The thickness of the intermediate ring 23 of the rotor according to this invention is the same as the stainless steel ferrule rotor in the known technique as this is the necessary thickness from a magnetic point of view to ensure there is no dispersion.

The 40 mm thickness of the standard steel ferrule 21 in the rotor according to this invention is the thickness necessary to support the stresses of machine overspeed and the weight of the magnets.

TABLE 2

| | | Density | Volume | Weight | Inertia |
|---|---|---|---|---|---|
| Invention rotor | Intermediate ring of amagnetic material | 1850 kg/m3 | 0.186 m3 | 344 Kg | 495 Kgm2 |
| | Standard Steel Ferrule | 7850 kg/m3 | 0.082 m3 | 640 Kg | 719 Kgm2 |
| Known Rotor | Stainless Steel Ferrule | 7920 kg/m3 | 0.186 m3 | 1473 Kg | 2121 Kgm2 |

Table 3 shows the weight and inertia reduction achieved with the rotor according to this invention.

TABLE 3

| | Invention rotor | Known Rotor | % Weight reduction | % Inertia reduction |
|---|---|---|---|---|
| Total Weight | 984 Kg | 1473 Kg | 66% | |
| Total Inertia | 1214 Kgm2 | 2121 Kgm2 | | 57% |

By analysing the data from Tables 2 and 3 it can be deduced that the weight and inertia reduction occurs particularly in cases of machines of large diameter and short stator pack length.

Although this invention has been fully described in relation to its preferred embodiments, it is evident that any modifications which are included within the scope of the invention may also be included, thus the invention is not limited to said preferred embodiments, as per the following claims.

The invention claimed is:

1. A rotor (11) for a permanent magnet electric machine which includes a plurality of permanent magnets (13) located between the poles (15) of the electric machine and a rotor hub, wherein said rotor hub comprises an internal ferrule (21) and an intermediate ring (23) between the internal ferrule (21) and said magnets (13), with said intermediate ring (23) being made of an amagnetic material of minimum thickness which prevents flux losses and which outer surface in contact with magnets (13) has a curved form so that the magnets (13) are supported in straight lines (27) on said surface contacting just at a point C, and with the internal ferrule (21) being made of a metal material with sufficient thickness to resist, together with the intermediate ring (23), the mechanical stresses caused by rotor (11) operation.

2. Rotor (11) for a permanent magnet electric machine as in claim 1, wherein the intermediate ring (23) is one sole part.

3. Rotor (11) for a permanent magnet electric machine as in claim 1, wherein the intermediate ring (23) is formed by various parts.

4. Rotor (11) for a permanent magnet electric machine as in claim 1, wherein the metal material of the internal ferrule (21) is selected from either steel or cast iron.

5. Rotor (11) for a permanent magnet electric machine as in claim 1, wherein the amagnetic material of the intermediate ring (23) is a plastic material.

6. Rotor (11) for a permanent magnet electric machine as in claim 1, wherein the amagnetic material of the intermediate ring (23) is aluminum.

7. Rotor (11) for a permanent magnet electric machine as in claim 1, wherein the amagnetic material of the intermediate ring (23) is a fibre-reinforced polymer matrix composite.

8. Rotor (11) for a permanent magnet electric machine as in claim 1, wherein the amagnetic material of the intermediate ring (23) is G11 Epoxy.

9. Rotor (11) for a permanent magnet electric machine as in claim 1, wherein said electric machine is a synchronous machine.

* * * * *